(12) United States Patent
Bertora

(10) Patent No.: US 7,156,811 B2
(45) Date of Patent: Jan. 2, 2007

(54) ULTRASONIC IMAGING METHOD AND APPARATUS

(75) Inventor: Franco Bertora, Genoa (IT)

(73) Assignee: Esaote, S.p.A., Milan (IT)

( * ) Notice: Subject to any disclaimer, the term of this patent is extended or adjusted under 35 U.S.C. 154(b) by 251 days.

(21) Appl. No.: 10/687,484

(22) Filed: Oct. 16, 2003

(65) Prior Publication Data

US 2005/0004459 A1 Jan. 6, 2005

(30) Foreign Application Priority Data

Oct. 16, 2002 (IT) .......................... SV2002A0052

(51) Int. Cl.
*A61B 8/00* (2006.01)
(52) U.S. Cl. ...................................... 600/447
(58) Field of Classification Search ........ 600/443–448; 128/916; 73/625–6, 602
See application file for complete search history.

(56) References Cited

U.S. PATENT DOCUMENTS

| 5,808,962 | A | * | 9/1998 | Steinberg et al. | ............... 367/7 |
| 5,851,187 | A | * | 12/1998 | Thomas et al. | ............. 600/447 |
| 6,179,780 | B1 | * | 1/2001 | Hossack et al. | ............. 600/437 |
| 6,309,356 | B1 | * | 10/2001 | Ustuner et al. | ............. 600/443 |
| 6,685,641 | B1 | * | 2/2004 | Liu | ........................... 600/443 |
| 6,685,645 | B1 | * | 2/2004 | McLaughlin et al. | ........ 600/447 |
| 6,695,778 | B1 | * | 2/2004 | Golland et al. | ............. 600/437 |
| 6,821,251 | B1 | * | 11/2004 | Alexandru | ................... 600/447 |

\* cited by examiner

*Primary Examiner*—Francis J. Jaworski
(74) *Attorney, Agent, or Firm*—Woodard, Emhardt, Moriarty, McNett & Henry LLP.

(57) ABSTRACT

An ultrasonic imaging method is described, wherein a back propagation processing method is used. The invention provides a limited number of channels for processing the received signals, such that the which number of processing channels is a submultiple of the number of receiving transducers. During the imaging process, different groups of receiving transducers are connected to the transmitting channels such that the groups of receiving transducers include as many receiving transducers as the number of processing channels in use.

16 Claims, 4 Drawing Sheets

ULTRASONIC IMAGING METHOD AND APPARATUS

CROSS-REFERENCE TO RELATED APPLICATION

The present application claims the benefit of Italian Application Serial No. SV2002A000052 filed on Oct. 16, 2002, which is hereby incorporated by reference in its entirety.

FIELD OF THE INVENTION

The invention relates to an apparatus and a method for ultrasound imaging, and in particular, to ultrasonic imaging using back propagation.

BACKGROUND

Ultrasonic imaging methods using the back-propagation technique as described above are known in the art. These methods, unlike beamformer focusing of transmit beams of transducer components on predetermined lines or points by selective activation with predetermined different delays of the individual transducers, allows to activate transducers simultaneously or with such delays as to generate an unfocused or partly focused beam. Unfocused beams may be, for instance, planar acoustic waves when transmitting transducers are aligned and form a plane, such as linear planar probes or in two-dimensional planar probes. When transducers are arranged along an arched surface, their array generates a spherical or curved wave. In most cases, transmitting transducers transmit parallel ultrasonic pulses with no delay being imparted thereto. Two-dimensional arrays, in which transducers are arranged in two dimensions may themselves generate planar or arched waveforms.

While transducers are usually activated simultaneously, delays may be imparted thereto, both for having the possibility of using focusing techniques which increase the versatility of the apparatus, and for correcting wave front aberrations caused, for instance, by an imperfect alignment of ultrasound transmission sources of transducers which would cause generation of an unfocused beam with irregular fronts, and affect the resulting quality.

As an equivalence exists between the signal propagation time and the signal penetration depth within a body under examination, an equivalence also exists between the signals backscattered from the body under examination in the two forms, i.e. in the time domain and in the frequency domain. These two forms may be obtained by using Fourier transforms.

The backscattered signal received by the receiving transducers is a time-domain signal, which may be transformed into a frequency-domain signal. This transformation, substantially corresponding to a spectrum analysis, allows to use the so-called back propagation processing method, which uses, instead of time, the distance of a predetermined propagation plane from a reference plane, the latter corresponding to the plane where the received signals are detected by receiving transducers. Actually, this technique allows to calculate, from propagation depths within the body under examination, the structure of the backscattered signal by translating the reference plane in the direction of propagation in the body under examination. In this way, structural information may be obtained about scattering elements in the region under examination in any propagation plane.

Inverse transformation of the signal or signals so reconstructed from the frequency domain back into the time domain provides the data for generating an ultrasonic image. As is apparent from U.S. Pat. No. 5,628,320 and U.S. Pat. No. 5,720,708, the back propagation method allows the generation of a complete image of the transmit beam relevant region without requiring any focusing along multiple adjacent scan lines both during transmission and reception. With this method, the complete image is generated for each transmit pulse, unlike the method in which transmit beams are successively focused along individual scan lines and release a transmit pulse for each line.

Therefore, as a rule, back propagation provides a frame rate increase.

The above-mentioned U.S. Pat. No. 5,628,320 and U.S. Pat. No. 7,720,708 provide a detailed and in-depth description of the back propagation theory and method, and the information contained therein is intended as a part hereof.

It shall be noted that back propagation does not strictly require transformation of received signals from the time domain into the frequency domain before back propagation calculation, and the inverse transformation of the signals obtained by said calculation from the frequency domain into the time domain. Nevertheless, these transformation steps provide advantages that are better shown in the two above mentioned documents.

Therefore, the back propagation technique obtains very high frame rates which provide practical advantages in very few cases.

However, in most cases, conventional transmit or receive focusing on lines or points is used as it provides sufficient frame rates for imaging purposes.

Both in back propagation ultrasonic imaging and in focused beam ultrasonic imaging, typical probes have 64, 128, or 256 transducers. Ultrasonic imaging machines must have a processing channel for each transducer or a processing channel for a partial number of the receiving transducers; therefore it always has a considerable number of channels. This involves a considerable hardware complexity which is associated with high costs. For instance, each transducer must be equipped not only with ultrasonic beam forming devices, but also with a dedicated analog-to-digital converter, filters and other circuitry required for extraction of relevant information for image reconstruction. The same requirements apply for the probes whose transducer array covers only a portion of a whole scan plane and is mounted in such a manner as to be movable in the probe structure to allow scanning of a whole slice plane.

In prior art, the back propagation method does not fully obviate the hardware high cost drawback, as the only cost reduction provided thereby is limited to the removal of ultrasonic pulse focusing units. The need still exists of providing a number of processing channels that is at least equal to a submultiple of the total number of receiving transducers, but may be also equal to the number of receiving transducers itself. Typically, prior art probes have 64 to 256 electroacoustic transducers, and as a rule apparatuses have at least 64 processing channels, which is a considerable number of channels.

U.S. Pat. No. 5,720,708 discloses a typical back-propagation imaging method and apparatus for achieving a high frame rate and in which only one ultrasound pulse is transmitted into the region to be imaged, while the echo signals received by the transducer array are elaborated at the same time for constructing in one single step the entire image data. This means that the method and the apparatus have a number of channels corresponding substantially to the number of transducer in the transducer array which are activated for receiving the echo signals.

Furthermore from U.S. Pat. No. 5,477,859 a method and a device are known allowing to reduce the number of channels needed to elaborate the signals of the transducers of a transducer array for constructing an image from the said received echo signals. In order to reduce the number of channels in the signal elaboration chain U.S. Pat. No. 5,477,859 suggests to carry out an analogical signal preprocessing consisting in applying a Narrow-Band Fourier beamforming on the signals provided by groups of transducers being positioned in closed spatial relationships one relatively to the other in the transducer array. This preprocessing step furnishes for each group of transducers in a vicinity relationship a single signal which can be than fed to a dedicated channel for elaborating out from this signal the corresponding image data. Thus the number of channels necessary to the construction of an image out of the echo signals is reduced. This kind of method and the corresponding device requires an analogical preprocessing step and thus for each group of transducers an analogical pre-processing chain. Thus the signals from the transducers are submitted to an analogical process before the following digital process steps. Furthermore the costs of the analogical preprocessing units for each of the groups of transducer elements at least partly reduces the advantages of the reduction in the number of channels.

SUMMARY OF THE INVENTION

The invention has the object of providing an ultrasonic imaging method which, by using the advantages of the back propagation imaging method as described herein allows to maintain current imaging velocity standards, particularly as regards the frame rate, while drastically reducing hardware costs and without affecting the quality of the resulting images.

The invention achieves the above purposes thanks to a method as described hereinbefore, which provides a limited number of processing channels, which is smaller than the number of receiving electroacoustic transducers, and is a submultiple of said number of receiving transducers, whereas for each imaging operation along a whole scan plane or a part thereof, a number of transmission steps is provided in which all the transmitting transducers are activated, i.e. with no focusing and/or with partial focusing of the transmit beam. The number of transducers is at least equal to the inverse of the submultiple of the receive channels with a different group of the receiving transducers of the array being connected, for each transmission step, to the transmit channels, with the groups of receiving transducers being composed of as many receiving transducers as the processing channels in use.

According to an improvement, the receiving signals are transformed by a Fourier transform from the time domain into the frequency domain before calculating back propagation, and by an inverse Fourier transform from the frequency domain to the time domain, after back propagation calculation.

In an extreme embodiment, each group of receiving transducers may have a single, different receiving transducer of the total number of receiving transducers, the number of transmission steps being equal to the total number of transducers, and a different receiving transducer being connected to a single receive channel for each reception step corresponding to one of the transmission steps.

This allows to also provide a number of receive channels greater than one, and to select a different number of active transmit channels each time, which number is variable from the minimum number of active channels, i.e. one channel, and the maximum number of active channels, i.e. all the receive channels.

In this way, the method allows to reach a frame rate variable within the number of processing channels.

Apparently, by using a single processing channel, and alternately switching it, after each transmission step, to a different receiving transducer, the image of a whole scan plane may be only obtained by performing at least as many transmission/reception steps as the receiving transducers in use. Here, frame rate conditions are unchanged as compared with the imaging technique in which the transmit beam and the receive beams are focused by means of beamformers.

Even when only two receiving channels are provided in lieu of the 128 or 256 receiving channels provided in prior art, the frame rate is twice as high as the one that may be reached by ultrasonic imaging techniques, in which the transmittal beam and the receiving beam are focused.

When four receiving signal processing channels are provided, such increase is 400% as compared with prior art beam focusing techniques. Advantages in terms of hardware cost reduction are considerable even in the latter case in which only four processing channels are provided instead of 256 channels, thereby avoiding the need for 252 channels.

The individual groups of receiving transducers may be composed of adjacent transducers of the receiving transducer array, but other transducer arrangements may be provided for each group in the receiving transducer array, particularly in non-adjacent arrangements.

Two further additional advantages are provided by the inventive method. A first additional advantage consists in the higher velocity of the back propagation processing method, as the conversion operations by Fourier transforms are conventional operations widely used in the electronic field that may be executed at considerable speeds, thanks to very modern, fast and low-cost hardware components. A second additional advantage, at least as important as the former, is that, unlike transmit beam focusing techniques, back propagation, which provides uniform activation of transmitting transducers, also causes a uniform distribution of the acoustic pressure and hence a lower risk of contrast agent destruction whenever imaging requires the use of contrast agents. This problem is not of secondary importance when considering the efforts that are currently directed toward limiting the mechanical energy to be transferred to contrast agents in combination with ultrasonic imaging processes executed with ultrasonic beam focusing techniques.

The invention also pertains to an ultrasonic imaging apparatus, which includes arrays of transmitting and receiving electroacoustic transducers connected to transducer pulse generators.

Circuitry determines signals received from the receiving transducers with reference to lines, planes, or surfaces of propagation in the region under examination, and processes the received signals into display driving signals.

According to the invention, the processing means include a number of channels for processing the receive signals from the individual transducers which is smaller than the number of receiving transducers, i.e. a whole submultiple of the total number of receiving transducers of the receiving transducer array, there being provided means for activating transmitting transducers as many times as the inverse of the whole submultiple and switching means which connect, after each transmit activation, the processing channels to a group of receiving transducers composed of as many receiving transducers as the processing channels in use, which receiving transducers of each group are different from those of the other groups.

Each group of transducers may consist of a single transducer of the transducer array with a single processing channel being provided.

The processing channels may be provided in a smaller number as compared with the total number of transducers in the transducer array, there being provided means for setting or selecting the number of transducers forming each group of transducers from a minimum number of one transducer to a maximum number corresponding to the number of channels.

The characteristics of the invention and the advantages derived therefrom will appear more clearly from the following description of a non limiting embodiment, as illustrated in the annexed drawings.

DETAILED DESCRIPTION OF THE INVENTION

For the purposes of promoting an understanding of the principles of the invention, reference will now be made to the embodiments illustrated herein and specific language will be used to describe the same. It will nevertheless be understood that no limitation of the scope of the invention is thereby intended. Any alterations and further modifications in the described processes, systems or devices, and any further applications of the principles of the invention as described herein, are contemplated as would normally occur to one skilled in the art to which the invention relates.

Figure 7:
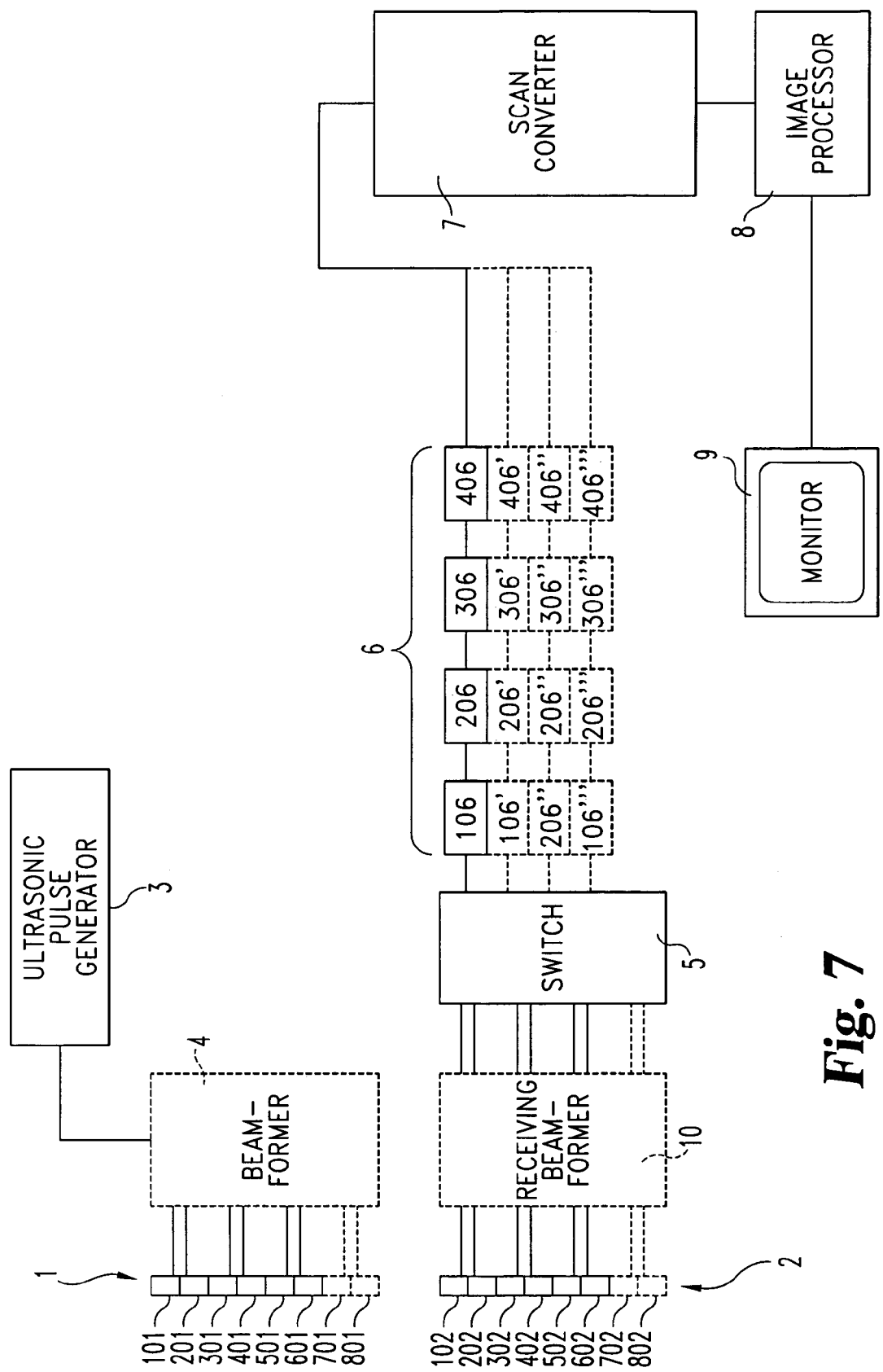
FIG. 7 shows a block diagram of an ultrasonic imaging machine according to the invention.

With reference to FIG. 7, a simplified block diagram is shown to provide a better understanding of an ultrasonic imaging apparatus. In order to improve understanding, two arrays 1, 2 of transducers 101 to 801 and 102 to 802 are shown, which represent separate transmitting and receiving transducers. This shall be intended without limitation because, as is known from prior art, the transmitting transducers and the receiving transducers may be formed by the same transducers which are alternately operated for transmission and reception.

An ultrasonic pulse generator 3 generates signals for exciting transmitting transducers 101 to 801 and these signals are transmitted to each transducer with such delays that the array of transducers generates a uniform ultrasonic wave. In the case of a linear planar array of transmitting transducers, this causes the generation of a planar ultrasonic wavefront. If the probe has an arched profile, the wavefront is accordingly rounded. A beam forming or focusing device, or beamformer 4, may be provided which imparts such delays to the signals transmitted to transducers as to deform the wavefront of the ultrasonic beam. These delays may be used, for instance, to generate a planar ultrasonic wave even when the transmitting transducers are in an arched arrangement, or vice versa. These delays may also have the function of compensating for any possible transducer misalignment caused by construction tolerances of the transducer array, or of allowing imaging by conventional beam focusing along individual scan lines, alternately to imaging as provided by this invention.

Typically, in order to obtain a homogeneous ultrasonic beam over the whole extension of the transmission surface of the receiving transducers 101 to 801, the transducers are fed together and coherently with the same excitation signal coming from the generator 3.

The ultrasonic beam so generated passes through the body under examination and is backscattered by the scatterers that form the structure of the body under examination in the region through which the transmitted ultrasonic beam penetrates. The receiving transducers 102 to 802 receive the backscattered ultrasonic beam and transform it into corresponding electric pulses. A switch 5 automatically switches the output of each receiving transducer 102 to 802 on a processing chain 6 which comprises an analog to digital converter 106, a processing unit for transforming the received signal by a Fourier transform from the time domain into the frequency domain, a back propagation processor, and a transforming processor which applies to the signal calculated by the back propagation processor an inverse Fourier transform from the frequency domain to the time domain. Then, the signals obtained thereby are stored in a scan memory of a scan converter 7 wherefrom they are read in a certain order by an image processor 8 for generating the image to be displayed on the monitor 9.

The circuitry components shown in the Figures are not novel features and are made of the usual components of prior art ultrasonic imaging apparatuses.

An example of these components and processing chains is shown and described in detail, for instance in U.S. Pat. No. 5,628,320.

As shown in FIG. 7, in order to process image data of the region penetrated by the whole homogeneous unfocused beam of transmitted ultrasounds, transmission shall be repeated as many times as the receiving transducers in use.

When considering conventional imaging based on beam focusing on a single line of a series of lines subtending a scan plane whose size substantially corresponds to the imaging region of the homogeneous unfocused ultrasonic beam like the one provided by this invention and when considering a resolution corresponding to as many lines as receiving transducers, even in this conventional imaging method, which uses focused beams for each scan plane, transmission and processing shall be repeated as many times as scan lines and particularly as transducers. As a result, the method of the invention involves no extension of the imaging time along a predetermined scan plane or volume. Conversely, it provides the advantage that, when a material sensitive to the mechanical pressure, i.e. to ultrasonic beam energy are contrast agents, generated by ultrasonic waves is provided, the homogeneous distribution of energy along the whole scan plane prevents concentration of energy in precise points, as well as the destructive effects derived therefrom. In fact, the latter consist of microbubbles that may be destroyed by the mechanical energy transmitted by ultrasonic waves. A homogeneous distribution of the total energy of the transmit beam on a larger region limits such effect.

According to a further characteristic of the invention, instead of having a single processing channel, the ultrasonic imaging apparatus may have a greater number of processing chains, e.g. two, three or more channels. Particularly, the number of processing channels is equal to an integral submultiple of the total number of receiving transducers. This allows to further reduce imaging times while keeping a very small number of hardware components to be replicated to form the receiving channels.

Even when only two receiving channels are provided, processing times are reduced to a half. This condition is shown in FIG. 7 by elements 106' to 206' and 106" to 306" and 106''' to 306''', which are shown in dashed lines, each forming one of three additional receive signal processing chains. Considering that, in this example, 8 receiving transducers 102 to 802 are shown, with four transmission channels, i.e. with a 50% reduction of the required components, such that imaging times are increased by a factor of 2, but are reduced by a factor of four as compared with the imaging times required by the ultrasonic beam focusing technique.

Still as shown in FIG. 7, the receiving transducers 102 to 802 may be connected to a receiving beamformer which is outlined by dashed lines and is designated by numeral 10. Such beamformer may be used both to correct aberrations caused by construction tolerances of the receiving transducer array and to possibly allow the apparatus to operate in receive beam focusing imaging mode.

The back propagation technique is known per se and is disclosed in detail by U.S. Pat. No. 5,628,320 and U.S. Pat. No. 5,720,708. Nevertheless, for a thorough understanding of this invention, FIGS. 1 to 6 show in a simplified and schematic manner what happens when back propagation is used. Back propagation substantially consists in the reconstruction of the past of an ultrasonic wave, based on the aspect thereof at the reception instant and with reference to the plane at which said wave is received, e.g. the plane subtended by the active receiving surface of the array of receiving transducers. When the reference plane is displaced within the body under examination in the propagation direction, a signal is obtained which corresponds to the wave form at the depth to which the reference plane is displaced. This operation may be performed by suitably processing the signals received from the receiving transducers.

The method for processing in such a manner the receiving signals includes a first processing step in which the time-domain receive signals are transformed in equivalent space- or frequency-domain signals by a Fourier transform function. Strictly speaking, back propagation consists in calculating space-domain receive signals as if they were received in a reference plane which is translated inside the body under examination in the transmit beam propagation direction within the body under examination. When such reference plane coincides with the scatterers of the structure of the body under examination, the signals correspond to the structure of the scatterers themselves. FIGS. 1 to 6 show this process with the help of snapshot images of the ultrasonic beam backscattered and processed with reference to reference planes translated to different depths of the body under examination.

Figure 1:
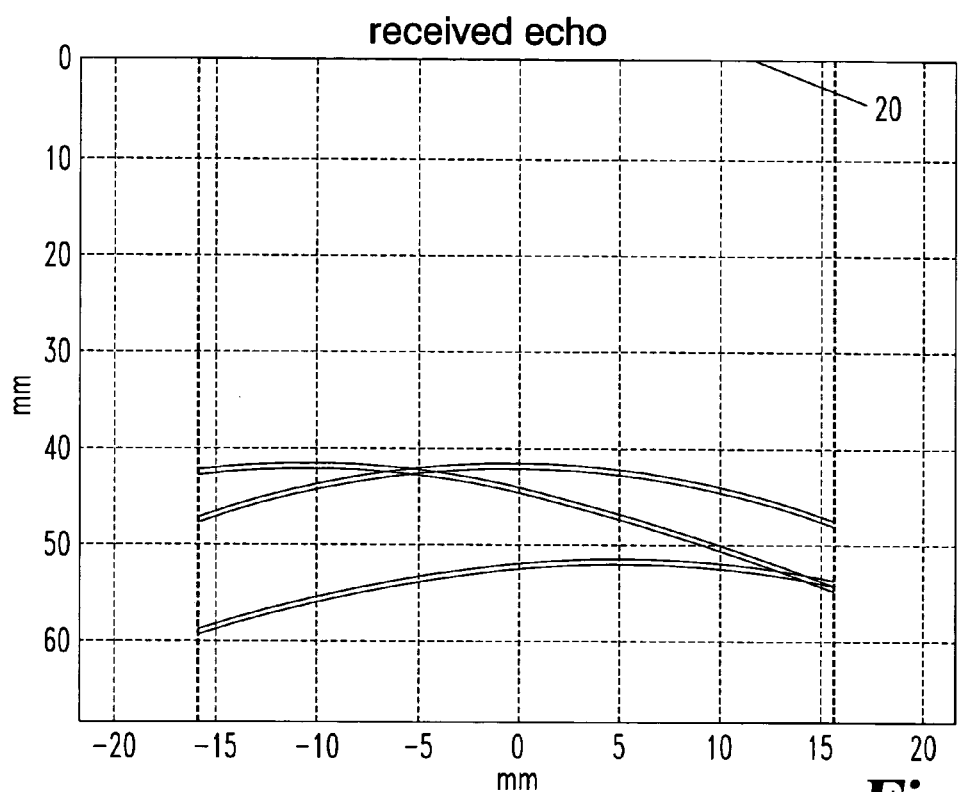
FIGS. 1 to 6 are simplified views of received and reconstructed wavefronts at different depth planes, generated in accordance with the present invention.
Figure 2:
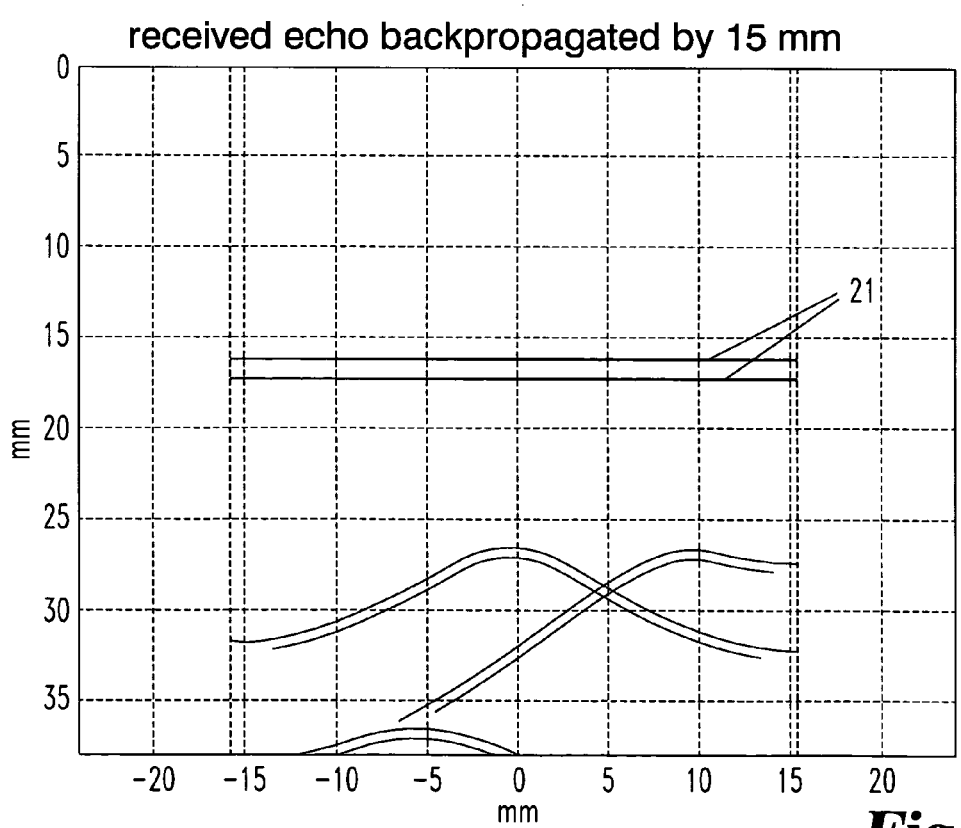
Figure 3:
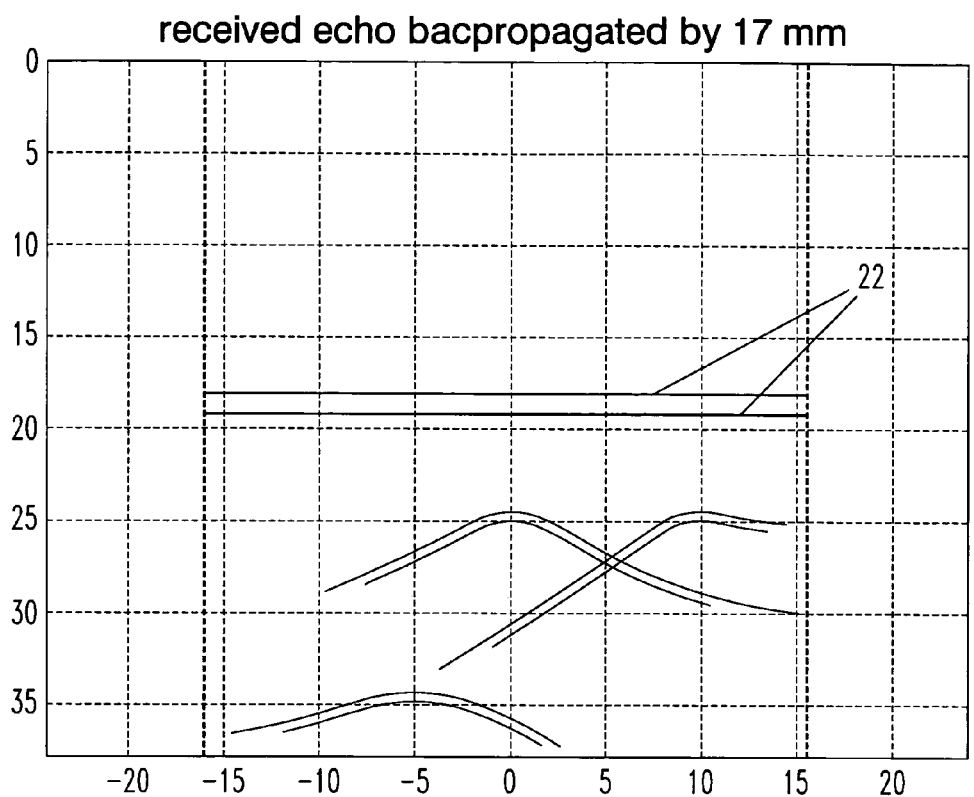

FIG. 1 shows the space-domain transformed signal, as detected with reference to the plane coincident with the receive plane of the receiving transducers, i.e. with a plane coincident with zero depth.

FIG. 2 to 6 show the waveform processed with the back propagation method, by displacement of the reference plane to different propagation depths within the body under examination and more precisely to depths of 15, 17, 20, 22 and 25 mm.

In these figures, the reference plane is designated by numerals 20, 21, 22, 23, 24, 25.

Figure 4:
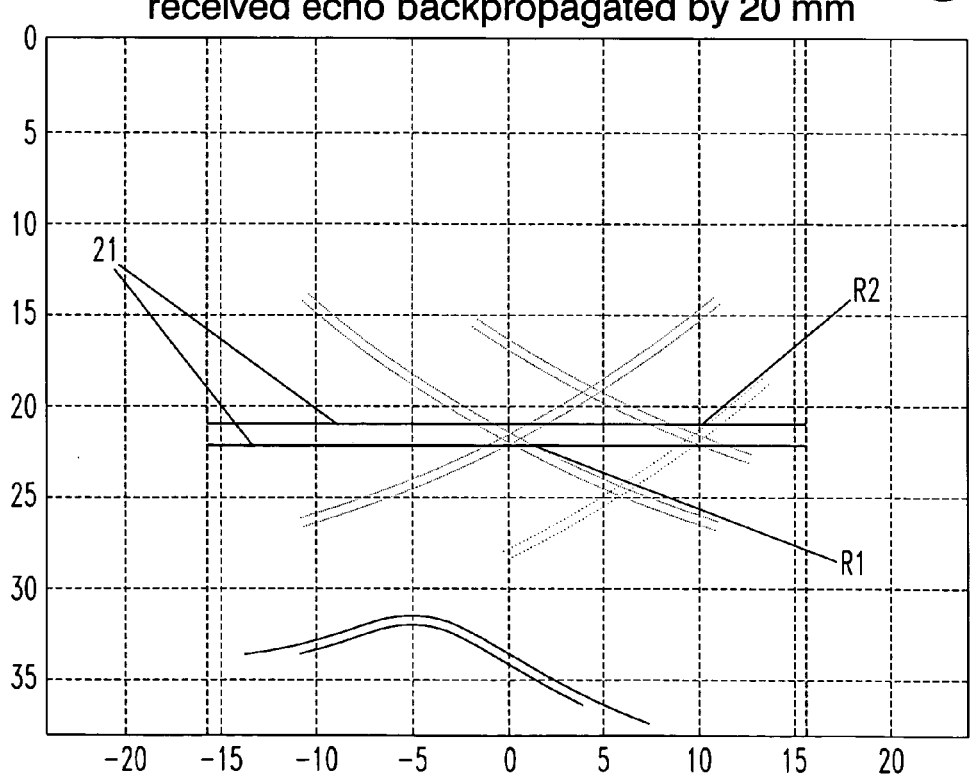
Figure 5:
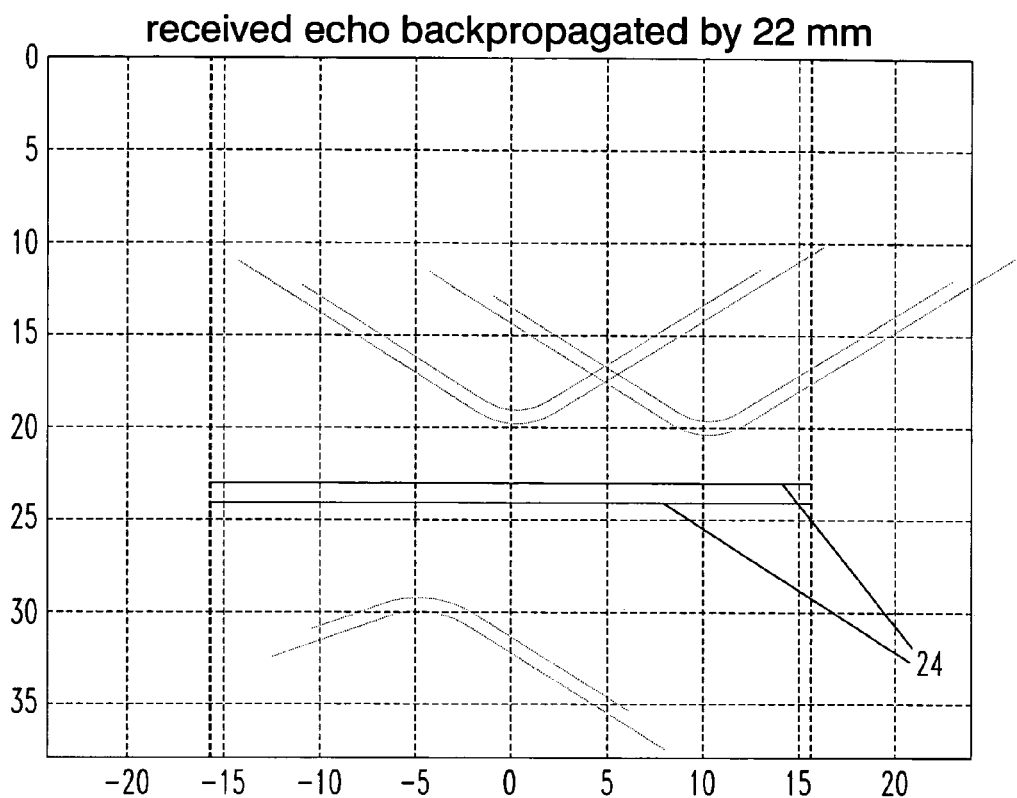
Figure 6:
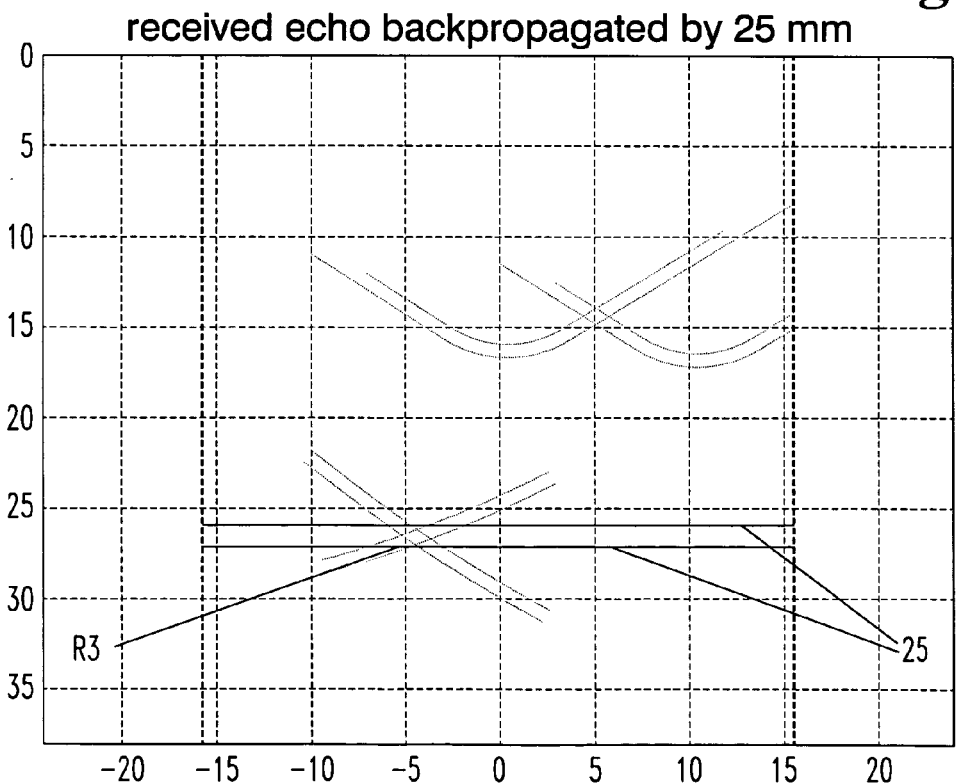

FIGS. 4 and 6 show the corresponding reference plane 23 and 25 in a position coincident with a scattering point and the corresponding processed waveform thanks to the back propagation technique.

The scatterers R1, R2, R3 are point scatterers and the function that describes the waveform obtained by "back propagation", at the corresponding depths of the scatterers R1, R2, R3 describes scattering points. From the physical point of view the representation is correct, as a point scattering source, when impacted by the acoustic transmit wave, behaves like a point source at zero time, and hence has the aspect of a scattering point. At later times, the wave propagates and widens as the distance increases, as can be detected by back scrolling images at smaller depths.

As soon as the second processing step is ended, the data obtained in the space or frequency domain are retransformed by an inverse Fourier transform back into the time domain and stored in the memory of a conventional scan converter.

Then, the electronics designed for reconstructing images on a display retrieves data from a scan converter and transforms them into display driving signals, with well-known methods, widely used in all ultrasonic imaging apparatuses.

Back propagation is a known technique, as mentioned above, and is described in detail, with further reference to its physical and mathematical basics, for instance, in U.S. Pat. Nos. 5,628,320 and 5,720,708.

The present invention contemplates modifications as would occur to those skilled in the art. It is also contemplated that methods embodied in the present invention can be altered, rearranged, substituted, deleted, duplicated, combined, or added to other methods as would occur to those skilled in the art without departing from the spirit of the present invention. In addition, the various stages, steps, procedures, techniques, and operations within these methods may be altered, rearranged, substituted, deleted, duplicated, or combined as would occur to those skilled in the art. All publications, patents, and patent applications cited in this specification are herein incorporated by reference as if each individual publication, patent, or patent application was specifically and individually indicated to be incorporated by reference and set forth in its entirety herein.

Unless specifically identified to the contrary, all terms used herein are used to include their normal and customary terminology.

Further, any theory of operation, proof, or finding stated herein is meant to further enhance understanding of the present invention and is not intended to make the scope of the present invention dependent upon such theory, proof, or finding.

While the invention has been illustrated and described in detail in the drawings and foregoing description, the same is considered to be illustrative and not restrictive in character, it is understood that only the preferred embodiments have been shown and described and that all changes and modifications that come within the spirit of the invention are desired to be protected.

What is claimed is:

1. An ultrasonic imaging method, comprising the steps of:
generating at least one ultrasonic pulse by activating a plurality of transmitting electroacoustic transducers of a predetermined array of transmitting transducers which pulse is directed into a region of a body under examination of a body under examination;
activating said transmitting transducers in such a manner as to generate a series of unfocused or partly focused scan lines;
receiving at a reference straight or curved line or plane or surface, a time-domain signal, consisting of a pulse back-scattered from said region under examination by each of a plurality of receiving transducers of a receiving transducer array;
calculating back propagation for said received signal from each of said receiving transducers to at least one straight or curved line or plane or surface through which said signal penetrates said region under examination, which straight or curved line or plane or surface of penetration is at a certain distance from said reference straight or curved line or plane or surface and corresponds to a predetermined penetration depth of said pulse in said region under examination;

processing said signals obtained by said back propagation calculation from each of said receiving transducers to obtain display driving signals; and providing a limited number of processing channels, which number is smaller than the total number of available receiving transducers and is an integral submultiple of said total number of available receiving transducers, whereas for each imaging operation, a number of transmission steps is provided in which all of said transmitting transducers are activated, which number is at least equal to the inverse of said submultiple of said processing channels, such that a different group of said receiving transducers are connected, to said processing channels for each transmission step with said groups of receiving transducers being composed of as many receiving transducers as said processing channels are in use.

2. A method as claimed in claim 1, characterized in that the following step is performed before the step of calculating back propagation from said received signal is performed:

transforming said received signals from each of said receiving transducers from a time domain into a frequency domain by a Fourier transform;

where after said step transforming said received signals from said time domain into said frequency domain is performed, the following step is performed:

transforming said back propagated signal, by an inverse Fourier transform, from a frequency domain signal to a time domain signal.

3. A method as claimed in claim 1, characterized in that each group of receiving transducers may have a single, different receiving transducer of the total number of receiving transducers, the number of transmission steps being equal to the total number of receiving transducers, and a different receiving transducer being connected to a single processing channel corresponding to each of said transmission steps.

4. A method as claimed in claim 1, providing a number of receiving channels greater than one, a different number of active transmission channels being selected each time, which number is variable from the minimum number of active channels, i.e. one channel, and the maximum number of active channels, i.e. all the receive channels.

5. A method as claimed in claim 1 providing at least two receiving signal processing channels, which are connected, after each transmission of an ultrasonic beam of a series of ultrasonic beam transmissions, to a corresponding number of different receiving transducers after each of the successive ultrasonic beam transmissions.

6. A method as claimed in claim 1, characterized in that the individual groups of receiving transducers, including as many receiving transducers as said processing channels in use, are composed of adjacent transducers of said receiving transducer array.

7. A method as claimed in claim 1, characterized in that the individual groups of receiving transducers, including as many receiving transducers as said processing channels in use, are composed of non-adjacent transducers of said receiving transducer array.

8. A method as claimed in claim 1, providing the application of variable transmission and/or reception delays to each of said receiving and/or transmitting transducer or group thereof, to correct ultrasonic beam divergences from a homogeneous, unfocused condition, caused by arrangement and/or operation tolerances of said transmitting and/or receiving transducers.

9. A method as claimed in claim 1, wherein said receiving transducer array includes at least one transmitting transducer.

10. An ultrasonic imaging apparatus comprising:

an array of transmitting electroacoustic transducers;

at least one pulse generator connected to said transducers;

an array of receiving electroacoustic transducers;

processing means connected to said array of receiving transducers and having at least one receiving signal processing channel;

means for providing frequency-transformed receiving signals with reference to one or more different planes of propagation in a region under examination;

means for processing said receiving signals into signals for controlling a display;

said processing means including a number of channels for processing said receiving signals from said receiving transducers, said number of channels being an integral submultiple of the total number of said receiving transducers;

means for activating said transmitting transducers as many times as the inverse of said submultiple; and switching means which connect, after each transmit activation, said processing channels to a group of said receiving transducers composed of as many receiving transducers as said processing channels in use, said receiving transducers selected being different after each transmit activation.

11. An apparatus as claimed in claim 10, further comprising:

means for transforming said receiving signals by a Fourier transform from a time domain to a frequency domain and for transforming said signals back into a time domain by an inverse transform;

means for executing said inverse Fourier transform from said frequency domain into said time domain.

12. An apparatus as claimed in claim 10, characterized in that each group of receiving transducers may be composed of a single receiving transducer.

13. An apparatus as claimed in 10, characterized in that said receiving signal processing channels are provided in a smaller number as compared with the total number of said receiving transducers of said transducer array, there being provided means for setting and/or selecting the number of said receiving transducers forming each group of transducers from a minimum number of one receiving transducer to a maximum number of receiving transducers corresponding to the number of processing channels in use.

14. An apparatus as claimed in claim 10, further comprising means for apply delays to said processing channels in order to compensate for homogeneous unfocused transmitting and/or receiving beam forming errors caused by construction and/or operation tolerances of said transmitting transducers and/or receiving transducers.

15. An apparatus as claimed in claim 14, wherein said delay means provides focusing delays to said transmitting transducers.

16. An apparatus as claimed in claim 14, wherein said delay means provides focusing delays to said receiving transducers.

* * * * *